Jan. 17, 1967 W. McKENZIE M. MORRISON 3,298,483
GEAR SHIFT MECHANISMS
Filed April 15, 1965 10 Sheets-Sheet 1

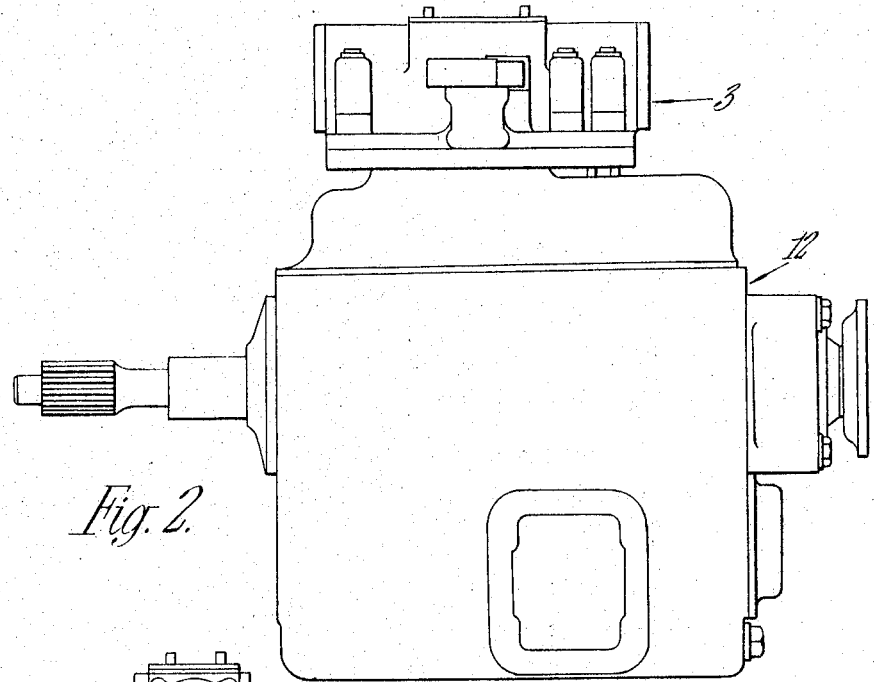
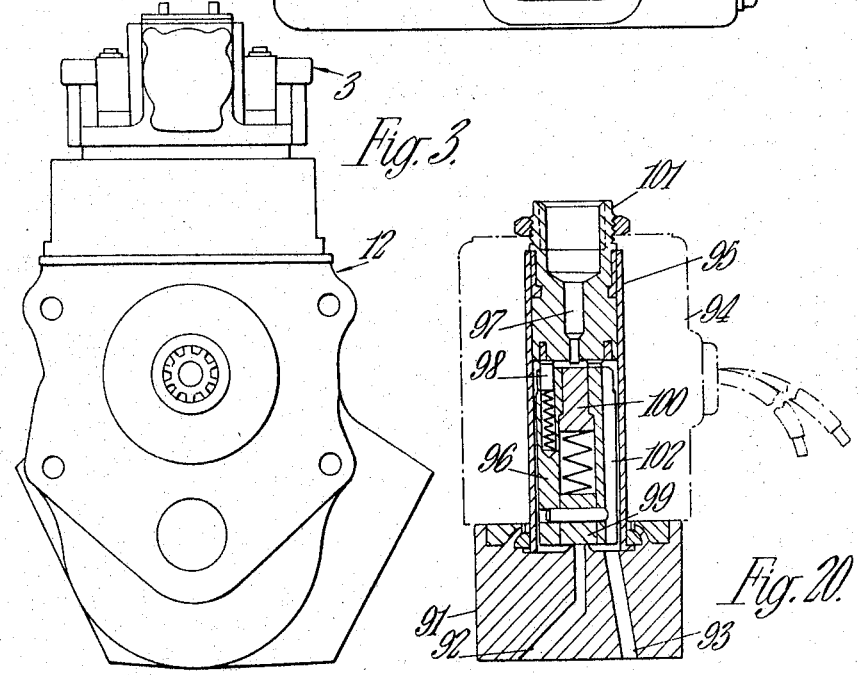
Fig. 2.
Fig. 3.
Fig. 20.

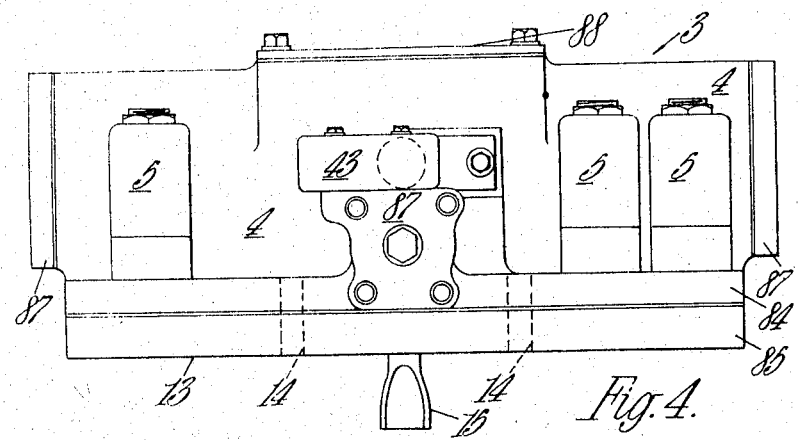
Fig. 4.
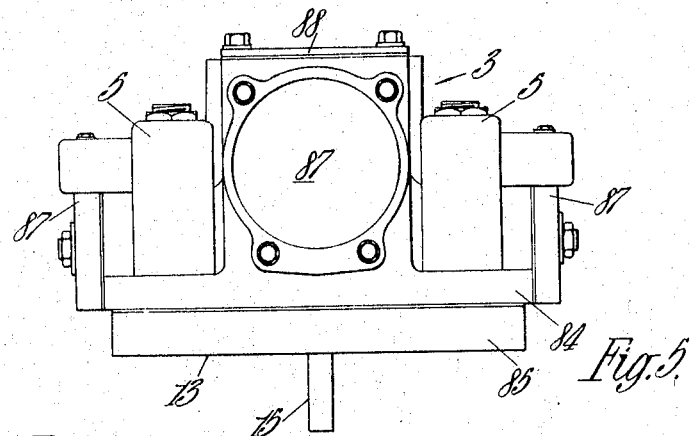
Fig. 5.
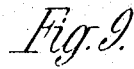
Fig. 9.
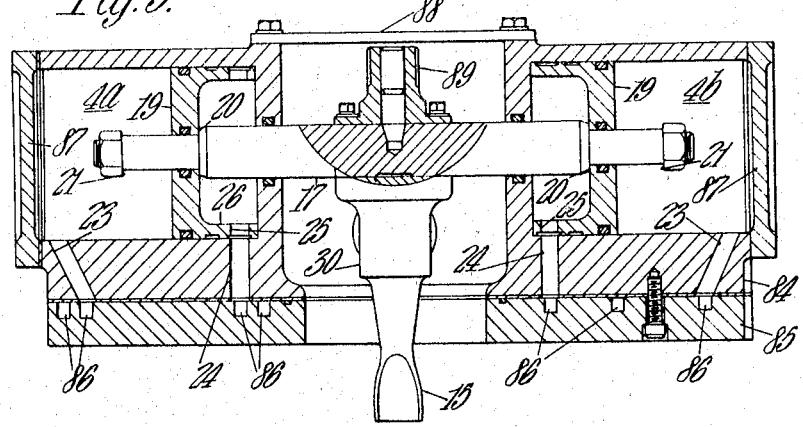

Jan. 17, 1967  W. McKENZIE M. MORRISON  3,298,483
GEAR SHIFT MECHANISMS
Filed April 15, 1965  10 Sheets-Sheet 4

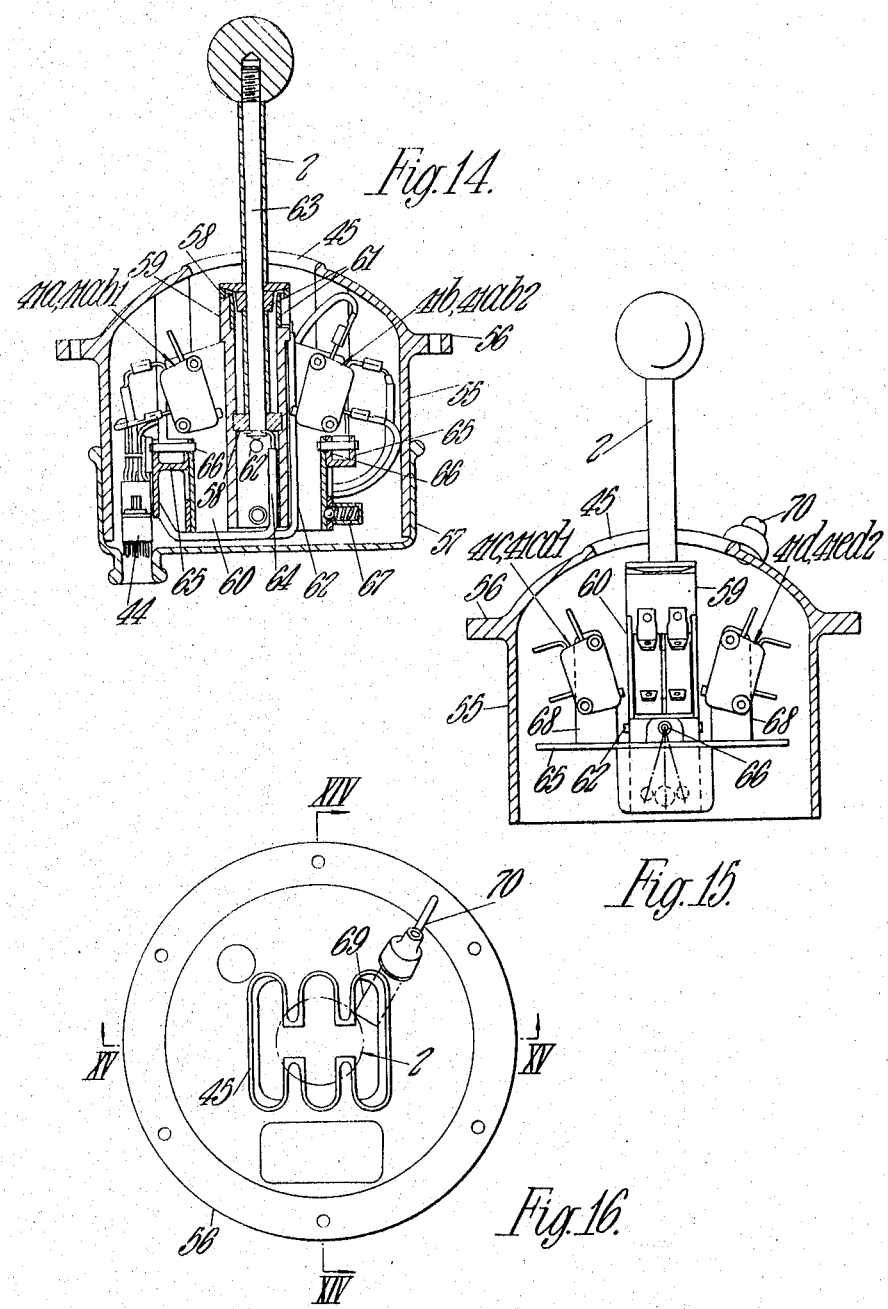

3,298,483
GEAR SHIFT MECHANISMS
William McKenzie Meek Morrison, Wolverhampton, England, assignor to Turner Manufacturing Co. Limited, Wolverhampton, England, a British company
Filed Apr. 15, 1965, Ser. No. 448,530
Claims priority, application Great Britain, Apr. 15, 1964, 15,542/64
11 Claims. (Cl. 192—3.5)

This invention relates to gear control mechanisms for automotive vehicles.

It is increasingly common for designers of automotive vehicles, especially commercial vehicles, to locate the engine and gearbox at a distance from the driver, thus leading to difficulty in connecting the gearbox to the gear lever. It is therefore an object of the present invention to provide a mechanism which will allow the gearbox to be placed at a distance from the driver while avoiding the use of cumbersome interconnections and which can be readily used in conjunction with existing gearboxes and vehicles.

According to the invention, we provide a gear control mechanism for co-operation with a shift bar or other operating member of a gearbox of an automotive vehicle, including a slave unit for attachment to the gearbox, and an operator's remote control unit, the slave unit having a selector member adapted to engage the operating member when the unit is attached to the gearbox, a plurality of air cylinders for moving the operating member in mutually perpendicular directions, and a plurality of solenoid valves cvontrolling the supply of air to the cylinders, and the control unit having a plurality of switches electrically connected to the solenoid valves whereby operation of the switches actuates the air cylinders.

Conveniently, there is a first pair of opposed air cylinders for moving the selector member in two opposite directions and a second pair of opposed air cylinders for moving the selector member in two opposite directions perpendicular to the two first mentioned directions.

In a preferred arrangement the slave unit includes a housing, a rod which can rotate about and slide parallel to its axis in the housing, a first pair of air cylinders enclosing opposite ends of the rod, a piston in each cylinder connected to the rod for moving the rod axially, a finger axially fast with and projecting laterally from the rod and constituting the selector member, a second pair of air cylinders on opposite sides of the finger and at right angles to the first pair of cylinders, and pistons in the second pair of cylinders engaging opposite sides of the finger for pivoting the finger about the axis of the rod.

In this arrangement the control system may include, for each pair of cylinders, a first solenoid valve connected to a first cylinder of the pair, a second solenoid valve connected to the second cylinder of the pair, and a third solenoid valve connected to both cylinders of the pair, each solenoid valve being adapted to admit compressed air to or exhaust it from the associated cylinder or cylinders, admission of compressed air by either one of the first and second valves serving to move the selector member in a respective one of said directions and admission of compressed air by the third valve serving to center the selector member with respect to the two cylinders of the pair, not more than one of the first, second and third valves admitting compressed air at any one time.

Each solenoid valve when deenergized exhausts the associated cylinder or cylinders and the first solenoid valve is controlled by a first normallly open switch, the second solenoid valve by a second normally open switch, and the third solenoid valve by two normally closed switches connected in series and each associated with a respective one of the first and second switches so as to be closed when the associated first or second switch is opened.

Preferably, the rod has a predetermined axial operating stroke and each of the pistons of the first pair of cylinders is slidable between inner and outer abutments on the rod, engagement of both pistons with the respective inner abutments centering the rod in the housing and engagement of either one of the pistons with the respective outer abutment moving the rod in a corresponding axial direction, the third solenoid valve communicates with the outer ends of each of the first pair of cylinders for connecting them to atmosphere or the supply of compressed air, and the first and second solenoid valves communicate with respective inner ends of the cylinders of the first pair for connecting them to atmosphere or a supply of compressed air, and each of the second pair of cylinders contains an outer piston, an abutment limiting the inward movement of the outer piston, an inner piston acting on the finger, the length of the inner piston being substantially equal to the distance between the abutment and the finger when the latter is centered in the housing, engagement of both outer pistons with their respective abutments centering the finger and inward movement of either one of the inner pistons pivoting the finger, first and second solenoid valves communicate with respective spaces between the inner and outer pistons of respective ones of the second pair of cylinders for connecting the space to atmosphere or a supply of compressed air, and a third solenoid valve communicates with the outer ends of both of said cylinders for connecting them to atmosphere or a source of compressed air, not more than one of the valves admitting compressed air at any one time.

My gear control mechanism can be used with a conventional three-pedal control, but if desired semi automatic clutch operation can be provided by the use of a switch operated by a cam surface on the selector member or rod.

The control unit may take various forms and could, for example consist simply of a set of push-buttons operating the switches. However, it will generally be found better to use a control lever moving in a gate to simulate the movements of a conventional gear lever, the gate defining a plurality of predetermined positions and the lever when in each predetermined position operating a switch or combination of switches unique to that position whereby said valves are actuated to bring the selector member to a position corresponding to that of the control lever.

To reduce power consumption we may provide a master switch connected in series with all of the switches connected to the solenoid valves, the master switch being normally open and being closed by movement of the lever away from any of the predetermined positions. Power will then be consumed only during gear changing.

A holding switch may be connected in parallel with the master switch and arranged for operation by the selector member so as to be open when the selector member is in a position corresponding to engagement of a gear or neutral, being closed when the selector member is between such positions. This ensures that every gear change is carried to completion even if the master switch opens before completion of the change.

The only connections required by our mechanism are an air supply to the slave unit, a cable harness running from the control unit to the slave unit, and an electric power input. None of these presents any restriction on the placing of the units. The air supply can be that normally available on commercial vehicles for braking and other units. Preferably the air cylinders use a pressure of about 45 p.s.i., which is low enough to avoid harsh gear changing and to provide a slight hesitancy which is desirable with synchromesh gearboxes.

It is envisaged that the slave unit will be so designed that it can simply be fitted on top of an existing gearbox in place of the conventional tower.

An embodiment of the invention will now be described by way of example with reference to the accompanying drawings, in which:

FIGS. 2 and 3 are side and end views respectively of the slave unit installed on a gearbox;

FIGS. 4 and 5 are side and end views respectively of the slave unit;

FIG. 9 is a view of the slave unit in section on line IX—IX of FIG. 6;

Figure 12:
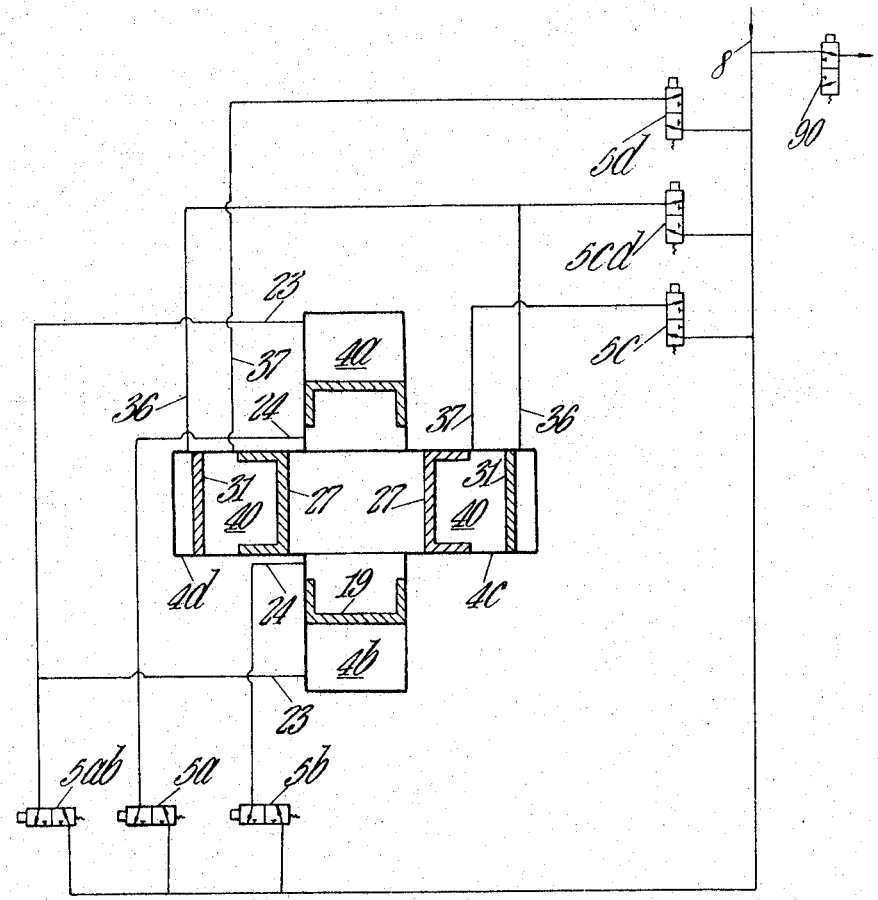
Figure 18:
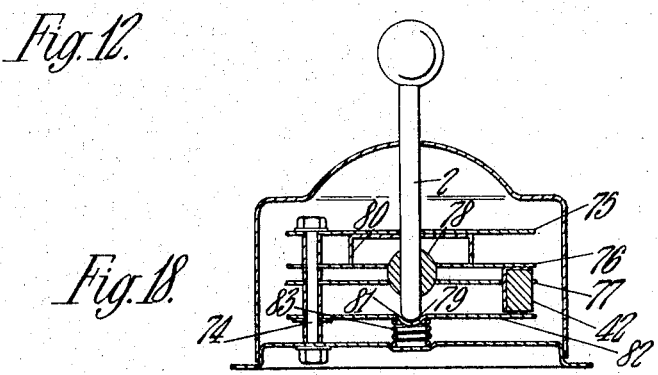
Figure 13:
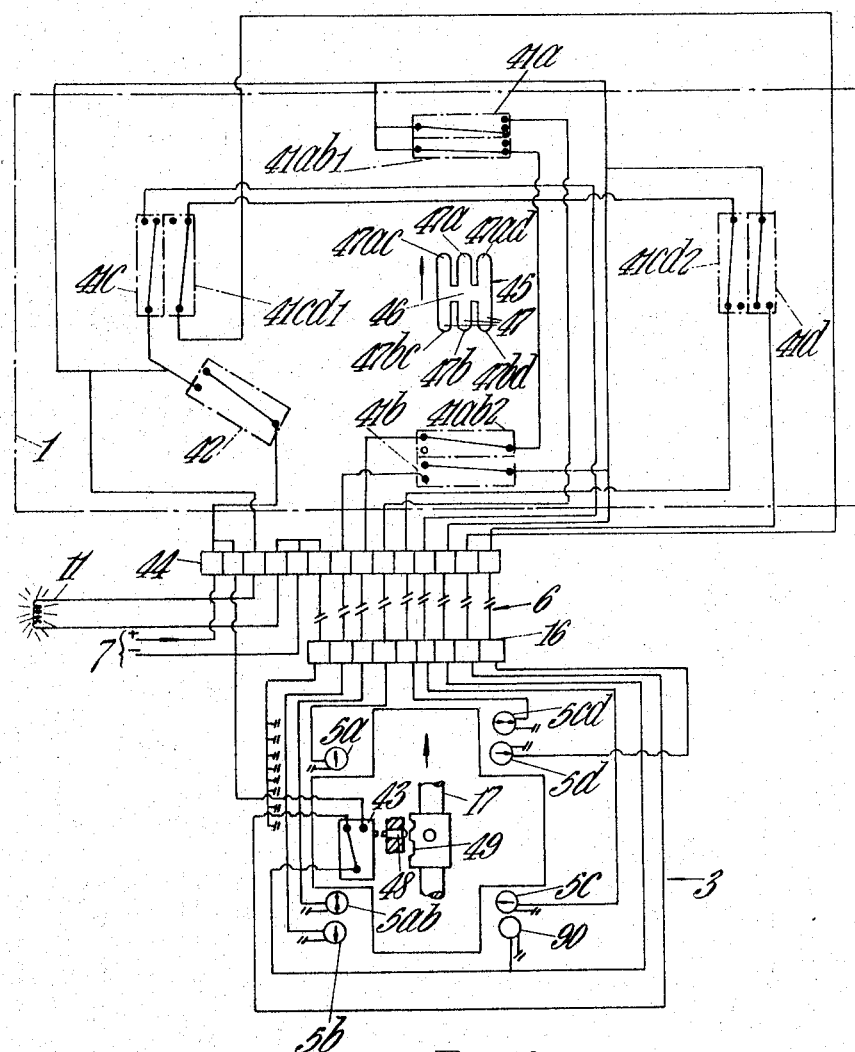
Figure 17:
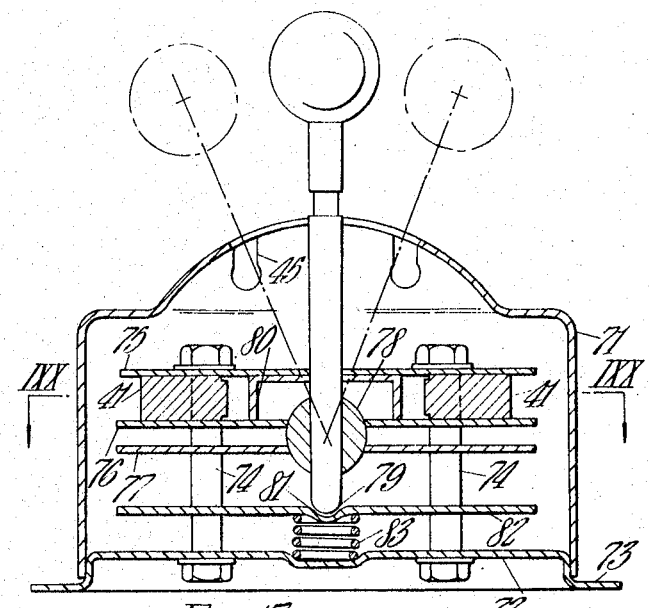
Figure 19:
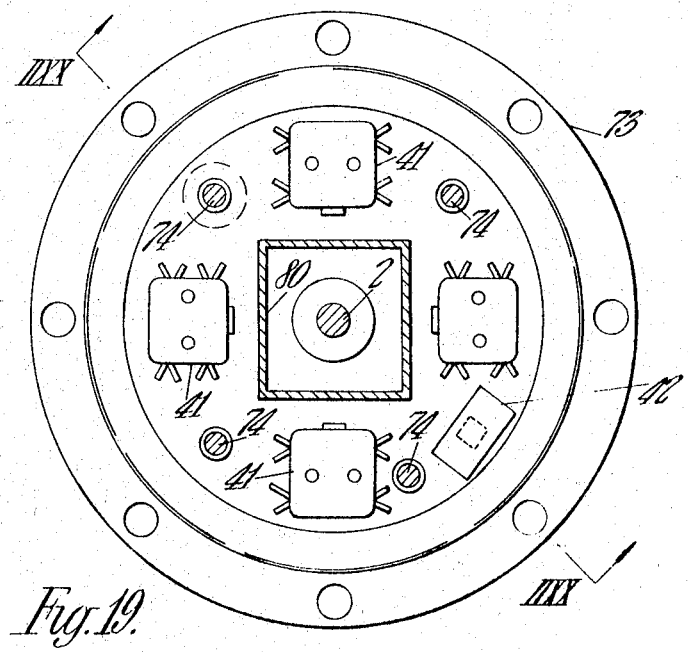

FIGS. 10a to c and FIGS. 11a to c illustrate the operation of the slave unit;

FIGS. 12 and 13 are circuit diagrams of the air and electrical circuits of the system respectively;

FIG. 14 is a view, in section on line XIV—XIV of FIG. 16, of the control unit;

FIG. 15 is a view in section on line XV—XV of FIG. 16, of the control unit;

FIG. 16 is a top view of the control unit;

FIGS. 17 to 19 are two views in vertical section and a view in horizontal section of an alternative control unit; and FIG. 20 is a sectional view of a solenoid valve.

The system shown consists of a driver's control unit 1 provided with a miniature gear lever 2, a slave unit 3 (seen in plan) containing four air cylinders 4 and six solenoid valves 5 controlling the cylinders, and a cable harness 6 linking the two units. Electrical power input terminals are provided at 7 and an air pipe 8 connects the slave unit via a pressure control valve 9 to air system 10 of the vehicle in which the system is installed. A driver's warning lamp 11 may also be provided. A multipin connector 16 joins the cable harness 6 to the slave unit.

As shown in FIGS. 2 and 3 the slave unit 3 is bolted on the top of a conventional gearbox 12 in the place of the conventional mechanical operating tower. The action of the slave unit on the gearbox 12 is exactly equivalent to that of the normal mechanical linkage and will therefore not be described in detail. As shown in FIGS. 4 and 5, the slave unit has a flat base 13 with bolt holes 14 for attachment to the gearbox, and through this base protrudes a finger 15 of a shape and size the same as that of the conventional mechanically operated finger. This finger constitutes the selector member of the mechanism and engages the internal mechanism of the gearbox to select the desired gear in known manner. It will be understood that the slave unit will be designed with a particular gearbox model in mind so that its various dimensions and motions correspond to the requirements of the particular gearbox model.

Figure 6:
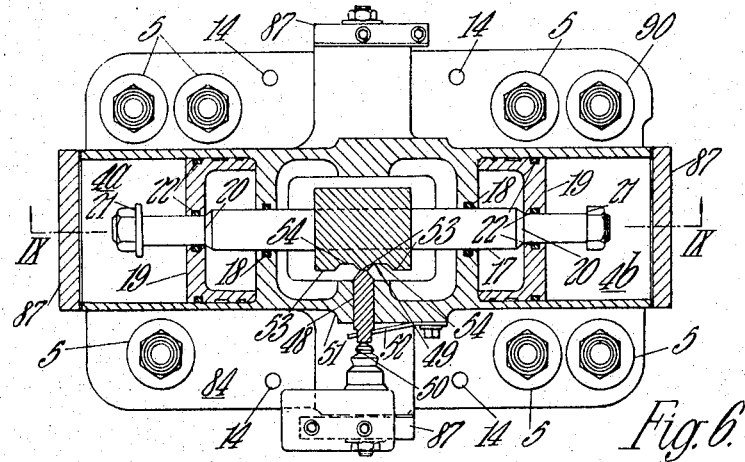
FIG. 6 is a plan view of the slave unit in section on line VI—VI of FIG. 8.
Figure 7:
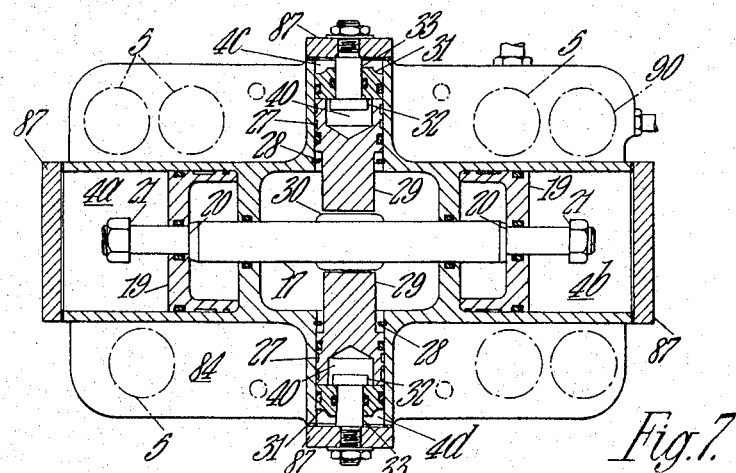
FIG. 7 is a plan view, partly in section at a level lower than FIG. 6, of the slave unit.

The slave unit contains two perpendicular pairs of air cylinders, one pair being larger than the other. The cylinders 4a, 4b of the larger pair are parallel to the axis of the gearbox and enclose the ends of a rod 17 which can slide in the inner end walls of the cylinders, and air seals 18 are provided (FIGS. 6 and 7). This rod carries at its middle the finger 15 (see FIGS. 8 and 9). In each cylinder 4a, 4b is a semi-floating piston 19 captive on the end of the rod 17 between inner abutment 20 and outer abutment 21, the free motion of the piston on the rod being about half the stroke of the piston in the cylinder. Air seals 22 are provided in the piston bearing on rod 17 and the side walls of the cylinder. As shown in FIG. 9 air ports 23 open into the outer ends of the cylinders 4a, 4b, and air ports 24 open into the inner ends of the cylinders, with openings 25 being provided in the pistons for access of air through their skirts 26. The rod and pistons are so shaped and dimensioned that when both pistons are at the inner end of their stroke they bear against abutments 20 and so positively locate the rod in its central position, corresponding to engagement by finger 15 of the neutral gear. Thus admission of compressed air through both ports 23 centers the rod, whereas admission of air through either one of ports 24 will carry the rod towards the outer end of the cylinder to which the air is admitted.

Figure 8:
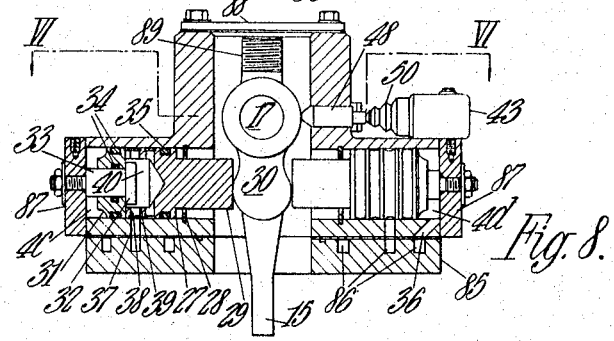
FIG. 8 is a cross sectional view of the slave unit.

The coaxial cylinders 4c, 4d, of the smaller pair are at right angles to rod 17 and slightly lower than it as shown in FIGS. 8 and 9 (it should be noted that FIG. 7 is sectioned on the median planes of both pairs of cylinders to show more clearly their relative positions). Each of these cylinders contains an inner piston 27 retained in the cylinder by a ring 28 and having a part 29 projecting adjacent to a curved bulging part 30 of finger 15. At the outer end of each cylinder 4c, 4d is an outer piston 31 held captive by head 32 on a pin 33 fastened into the outer end of the cylinder. Air seals 34 are provided on the inner and outer peripheries of the pistons 31 and air seals 35 on pistons 27 but the inner ends of cylinders 4c, 4d from which pistons 27 project are open. Ports 36 allow access of air to the outer end of each cylinder and ports 37 and ports 38 in the skirts 39 of pistons 27 allow access to spaces 40 between pistons 27, 31. The pistons 27 and pins 33 are so dimensioned that when both pistons 31 abut on heads 32 they hold pistons 27 in contact with bulge 30 thereby centering the finger 15 in a vertical position, but the finger 15 and rod 17 always remain free to slide under the action of pistons 19 between pistons 27. Thus admission of compressed air through both ports 36 centers the finger. Admission of air through either of ports 37 drives the corresponding piston 31 outwards and piston 27 inwards to bear against bulge 30 and hence pivot finger 15 about the axis of rod 17.

Figure 10A:
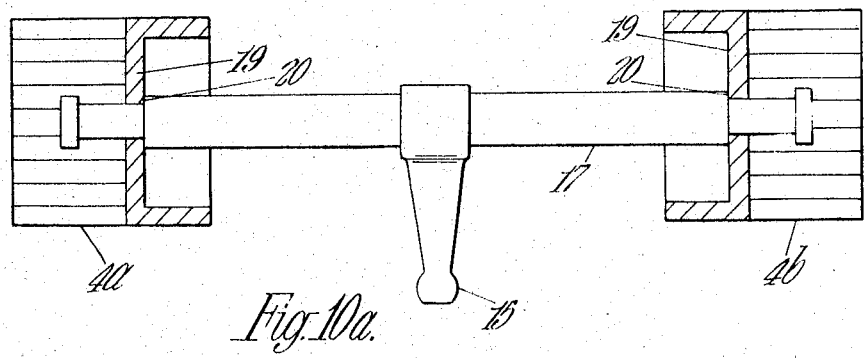
Figure 10B:
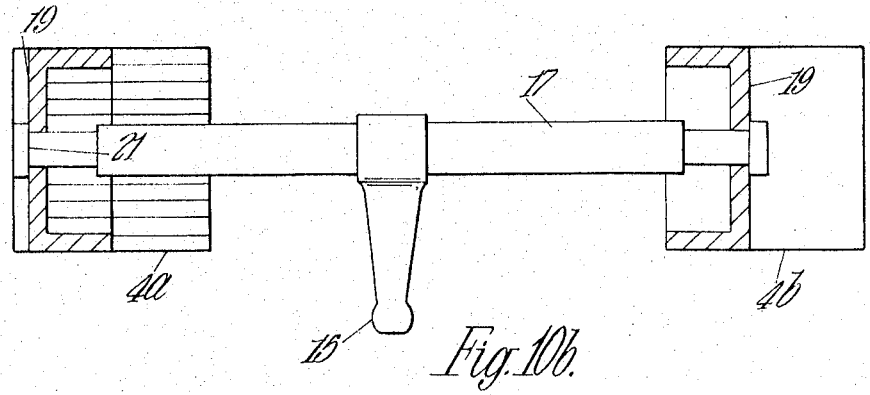
Figure 10C:
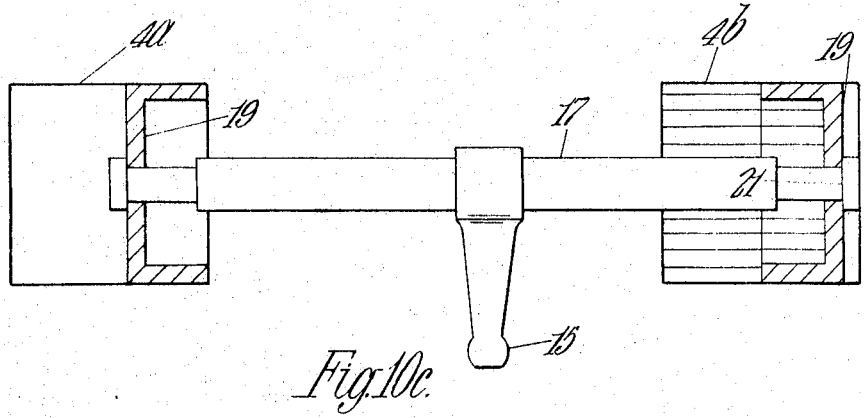
Figure 11A:
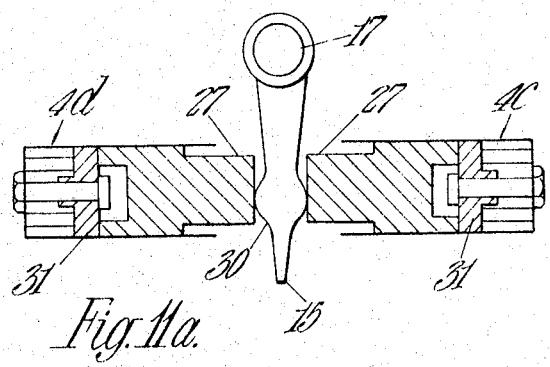
Figure 11B:
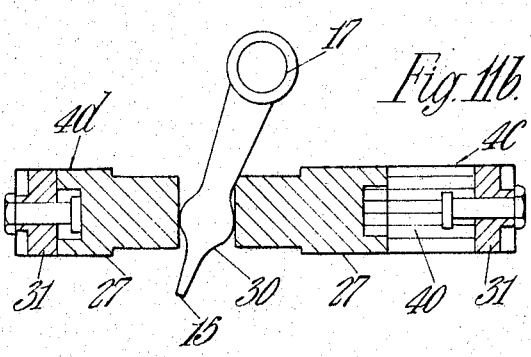
Figure 11C:
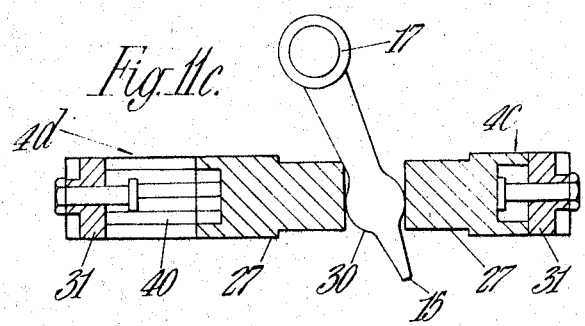

The operation of the air cylinder to move the selector finger 15 is illustrated by FIGS. 10a to 11c; in these figures the regions containing air under pressure are shown by horizontal hatching. FIGS. 10a to 10c are side views showing the action of cylinders 4a and 4b and FIGS. 11a to 11c are end views showing the action of cylinders 4c and 4d.

In FIG. 10a, compressed air has been admitted through both ports 23 (FIG. 9) and the outer ends of the cylinders are both under pressure. Both pistons 19 engage inner abutments 20 to locate rod 17 positively in its central position, corresponding to engagement of the neutral gear. FIG. 10b shows cylinder 4b exhausted and cylinder 4a pressurized at its inner end by port 24 (FIG. 9). Piston 19 of cylinder 4a has engaged the outer abutment 21 and pulled rod 17 through the other piston 19 so as to move finger 15 a distance equal to the difference between the stroke of piston 19 and the free play of piston 19 between the abutments. Conversely, in FIG. 10c cylinder 4a is exhausted and the inner end of cylinder 4c is pressurized so as to move rod 17 to its other extreme position.

In FIG. 11a, compressed air has been admitted through both ports 36 (FIG. 8) and the outer ends of cylinders 4c, 4d are under pressure. Both pistons 31 engage heads 32 thereby advancing pistons 27 to locate finger 15 in its central position. FIG. 11b shows cylinder 4d exhausted and cylinder 4c under pressure in space 40 by way of port 37 (FIG. 8). Piston 27 of cylinder 4c has advanced against finger 15, pivoting the latter and pushing pistons 27, 31 of cylinder 4d to the outer end of their cylinder. Conversley FIG 11c shows cylinder 4 exhausted and cylinder 4d under pressure in space 40 so as to pivot finger 15 to its other extreme position.

It will be seen that the action of the cylinders defines nine distinct positions of finger 15. However, three of these (i.e. all three positions of FIGS. 11a to c when combined with the position of FIG. 10a) correspond to engagement of neutral, leaving six positions for engagement of forward or reverse gears.

To produce these motions of the pistons 19, 27, 31, the air circuit shown schematically in FIG. 12 is used. The two ports 23 are connected by a common line to a solenoid valve 5ab and the two ports 36 are connected by a common line to a solenoid valve 5cd. Ports 24 of cylinders 4a and 4b are connected to solenoid valves 5a and 5b respectively, and ports 37 of cylinders 4c and 4d are connected to solenoid valves 5c and 5d respectively. Each solenoid valve is a three-way valve arranged to connect the associated port or ports to atmosphere or to the air supply line 8 and connection is made to the air supply line only when the valve is energized. Consequently FIGS. 10a to 10c correspond to energization of valves 5ab, 5a, and 5b respectively and FIGS. 11a to 11c correspond to energization of valves 5cd, 5c and 5d respectively.

To operate the valves we use the circuit of FIG. 13, consisting basically of eight switches 41a, 41b, 41ab1, 41ab2, 41c, 41d, 41cd1, 41cd2 in the control unit 1 and operated in various combinations to energize the various solenoid valves as set out above, a master switch 42 in the control unit in series with the power supply to all of the said eight switches, and a holding switch 43 associated with the slave unit. Switches 41a and 41b are normally open and control valves 5a and 5b respectively; switches 41ab1 and 41ab2 are normally closed and are connected in series to control valve 5ab. Switches 41c and 41d are normally open and control valves 5c and 5d respectively, and switches 41cd1 and 41cd2 are normally closed and are connected in series to control valve valve 5cd. These switches are grouped in pairs of one normally open and normally closed switch: 41a with 41ab1 and 41b with 41ab2, with simultaneous operation of these two pairs being impossible; and 41c with 41cd1 and 41d with 41cd2, with simultaneous operation of these two pairs being impossible. Cable harness 6, multi-pin connector 16, and a further multi-pin connector 44 on the control unit, are schematically shown in FIG. 13.

It will be clear that normally switches 41ab1, 41ab2, 41cd1, and 41cd2 energize solenoids 5ab and 5cd so that finger 15 is centered both laterally and longitudinally as in FIGS. 10a and 11a. The control lever 2 moves in a gate 45 having one lateral arm 46 crossed by three fore-and-aft arms 47 defining end positions 47a, 47b, 47ac, 47ad, 47bc and 47bd. So long as the lever 2 is in the arm 46 of the gate, valve 5ab is energized and neutral is selected. Movement of lever 2 to position 47a closes switch 41a and opens switch 41ab1, de-energizing valve 5ab and energizing valve 5a so as to move rod 17 to the position of FIG. 10b. Similarly movement of lever 2 to position 47b closes switch 41b and opens 41ab2 to energize valve 5b and de-energize valve 5ab and move rod 17 to the position of FIG. 10c. Movement of lever 2 to position 47ac has the same effect as movement to position 47a and also closes switch 41c and closes switch 41cd1, thereby energizing valve 5c and de-energizing valve 5cd so as to pivot finger 15 to the position of FIG. 11b; thus the finger is both pivoted on and slid along with rod 17. In a similar way movement of lever 2 to position 47ad, 47bc, or 47bd energizes valves 5a, and 5d, 5b and 5c, or 5b and 5d, respectively, so that for each position of lever 2 the finger 15 takes up a corresponding position.

Master switch 42 is arranged to be closed only when lever 2 is moved, so as to avoid a continuing drain of power by the valves. To ensure that each gear change is completed, even if switch 42 should open before completion, holding switch 43 operated by a cam follower 48 bearing on a cam surface 49 on rod 17 is connected across switch 42 so as to hold the power connection as long as rod 17 is between its extreme positions and not in neutral position. Thus, the initial power supply to the valves passes through switch 42 as lever 2 is moved. As soon as rod 17 moves in response an alternative power circuit is made through switch 43 and this is held until the rod reaches the selected position when cam surface 49 breaks the circuit. Lamp 11 is lit as long as the power supply to the valves is on.

When the power is cut off on completion of the movement of rod 17, all valves are de-energized and all cylinders connected to atmosphere. The finger 15 therefore stays in the selected position until one of the valves is energized again, being held in place either by detents in the slave unit or by the detents normally provided in the gearbox. It will be seen that the finger will remain in its selected position even if the air or electricity supply fails, since the slave unit cylinders are normally connected to atmosphere anyway.

Figure 1:
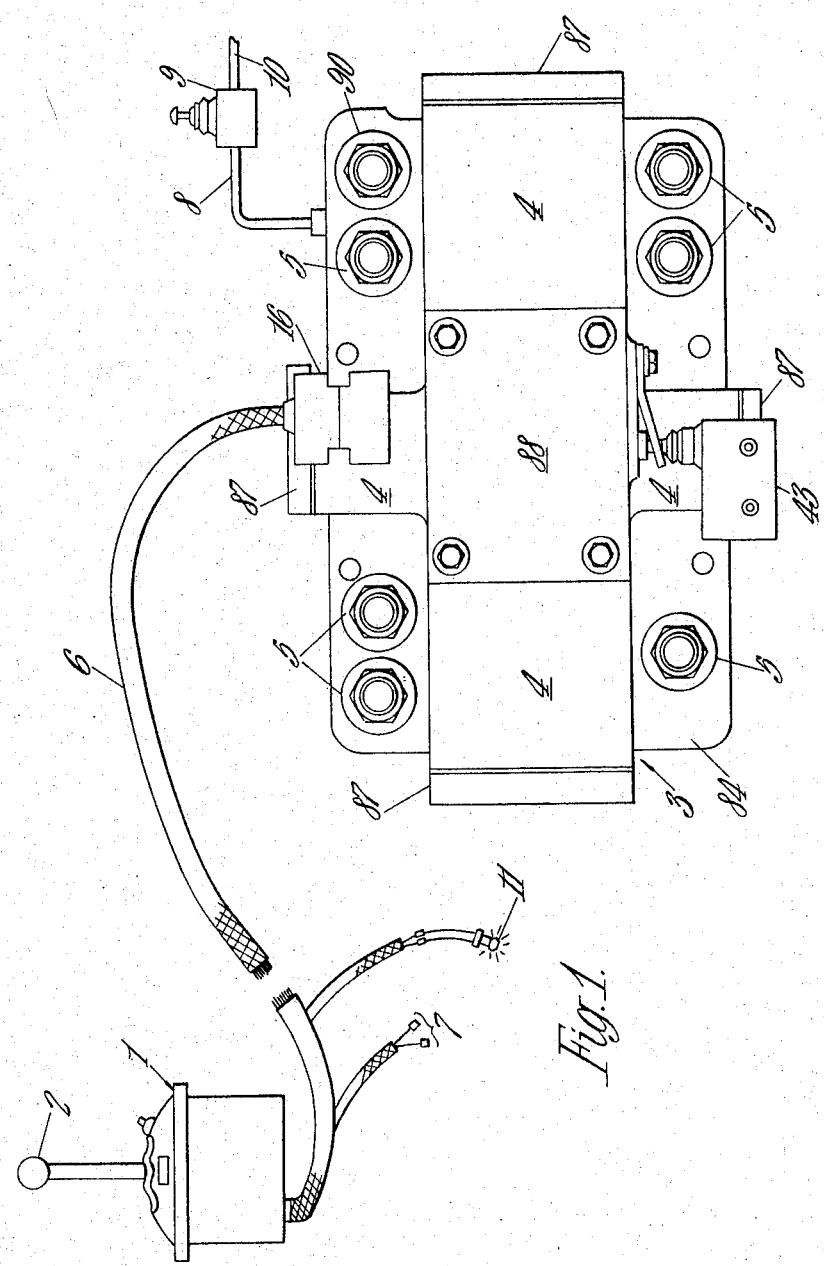
FIG. 1 illustrates the layout of a complete control system, showing the slave and control units and connections thereto.

The holding switch arrangement is shown in more detail in FIGS. 1, 6 and 8. As shown therein, switch 43 is a microswitch mounted on the slave unit above cylinder 4d with its actuating button 50 projecting towards the rod 15 and engaging one end of cam follower 48 which is a plunger slidably mounted in the wall 51 of the slave unit, the other end of plunger 48 resting, under the pressure of a leaf spring 52 fastened to wall 51, against cam surface 49 of the rod 17. This cam surface consists of three lands 53 separated by grooves 54, the lands being aligned with plunger 48 when the rod 17 is in its central position or either of its extreme positions so that in these positions the power circuit to the control unit through switch 43 is broken.

The control unit shown in FIGS. 14 to 16 has a cylindrical cast housing 55 with a domed top containing gate 45 and having a fixing flange 56, and a base sleeve 57. It is made small enough to permit mounting in any convenient position, e.g. on a floor column or the steering column or set into the fascia or engine casing. Choice of position is unrestricted since the only external connection is the multi-pin connector 44 for the cable harness 6. The shift pattern is arranged to reproduce that of the conventional gear lever.

The mechanism comprises a short lever 2 resiliently mounted at 58 in a concentric sleeve 59 which in turn is pivoted at 62 in a gimbal frame 60 and suitably detented to provide three fixed positions, namely vertical and approximately 15° each side of the vertical. The gimbal frame is extended in such a manner as to permit two pairs of microswitches 41a with 41ab1 and 41b with 41ab2 to be mounted so that movement of the lever and sleeve approximately 7½° away from the vertical actuates the appropriate pair of switches. The lever and sleeve are fitted with copper rings 61, connected to lead 62 and through the metal core 63 of lever 2 to lead 64, which contact to transmit the driver's movement, and thus act as the master switch. In turn, the gimbal frame is pivoted at 66 within a main frame 65 the axis of pivot being normal to that of the lever pivot 62 and in the same plane. The frame 60 is also detented by ball catch 67 to provide three fixed positions similar to those described earlier for the lever, but at right angles owing to the pivot disposition, thus providing nine positive detented positions of the lever 2 relative to the complete assembly.

Extensions 68 of the main frame are used to present to gimbal frame 60 two pairs of microswitches 41c with 41cd1 and 41d with 41cd2 so that movement of the gimbal frame approximately 7½° from the vertical actuates one or other of the pairs. The whole arrangement therefore ensures that the first-mentioned two pairs of switches sense movement of lever 2 parallel to the gearbox axis, and the other two pairs sense movements normal to the axis. The gate 45 provided in the housing ensures that the switches are only actuated in sequences suitable for gearbox operation. The use of changeover switches (as shown in FIG. 13) permits operation as "normally open" or "normally closed" units, as required, and all internal wiring terminates in a single multi-pin connector 44.

The internal circuit is arranged so that initial movement of the lever closes the master switch contacts 61 to supply current to all other switches of the control unit thus energizing the solenoid valve or valves last selected. Further movement actuates one pair of micro switches simultaneously, de-energizing the previously selected valve or valves and energizing a new selection. This sequence takes place during any movement to or from the central position along either axis and different combinations of movement, each having this sequence pattern, determine the complete shift command. As it is possible for the master switch to be released before the gearbox synchronizes and completes the shift selected, the holding switch 43 on the power shift unit maintains the electrical supply as long as is necessary.

The resilient mounting of lever 2 in sleeve 59 is self-centering. When a force is applied to lever 2 to move it, it is deflected within sleeve 59 and contacts 61 of the master switch close. As soon as the force is released contacts 61 are opened by the action of the resilient mounting and power cannot flow to the other switches except by way of holding switch 43 as already described. Thus, any motion of lever 2 away from one of the positions defined by the detents in the control unit and by gate 45 will close the master switch to initiate gear changing.

To prevent inadvertent selection of reverse gear, we may provide on the domed top of casing 55 a pivoted tongue 69 rotatable by a knob 70 to block the arm of gate 45 corresponding to reverse gear, as shown in FIG. 16.

FIGS. 17 to 19 show an alternative control unit having a domed casing 71 and a base 72 with mounting flange 73. FIG. 19 is in section on line IXX—IXX of FIG. 17 and FIG. 18 in section on line IIXX—IIXX of FIG. 19. Four pillars 74 support three spaced plates 75, 76, 77, four pairs of microswitches 41 corresponding to those already described being mounted between upper plates 75, 76 and lever 2 being mounted in a ball 78 rotatably supported between lower plates 76, 77 with its end 79 projecting downwards. A rectangular box-like follower 80 fitted on lever 2 and slidable between plates 75, 76 actuates the pairs of switches on movement of lever 2. The lever end 79 when vertical rests in a depression 81 in a plate 82 upwardly loaded by spring 83 and tiltably mounted on one of the pillars 74 (FIG. 18). Thus movement of lever 2 through neutral (i.e. the central position) depresses plate 82 which tilts and actuates master switch 42 mounted on plate 76. The mode of operation is identical with that already described.

Some further features of the system will now be mentioned.

The slave unit consists of a main casting containing the four air cylinders and having a base flange 84 (see e.g. FIG. 1, FIGS. 4–9) on which the solenoid valves are mounted, and a base plate 85 screwed to flange 84. The mating faces of flange 84 and plate 85 are machined and plate 85 has in its upper face grooves 86 connecting the various air ports and solenoid valves, and this measure greatly simplifies construction. Plate 85 also carries the external air connection. The cylinders are cast with open outer ends, subsequently closed by plates 87. The central space between the cylinders is also open when cast and is closed in use by a bolted-on plate 88. On rod 17 below plate 88 is a screw-threaded boss 89. In an emergency, e.g. to select a gear for tow starting or to select neutral for towing, plate 88 is removed and a suitable handle attached to boss 89 to permit manual movement of rod 17. It should be noted that failure due to loss of pressure in the air reservoir of the vehicle can be dealt with simply by de-clutching and running the engine to re-charge the reservoir.

The system so far described requires the use of conventional clutch control by the driver. If desired, semi-automatic clutch operation can be added by means of a seventh solenoid valve 90 operated directly by the master switch 42 (see FIG. 13) and controlling the clutch withdrawal mechanism (not shown). Conveniently valve 90 is mounted with the other valves on the slave unit; it requires only an additional electrical connection. This facility will normally be additional to the conventional clutch pedal control, and is intended for use only after the vehicle is in motion, except where the gearbox is allied to a torque conversion or fluid flywheel when the facility can be used in all conditions.

FIG. 20 shows in section a suitable solenoid valve, having a base 91 containing compressed air port 92 and service port 93, coil 94, sleeve 95 containing armature 96, and a top closure 101 for the sleeve containing exhaust port 97. Armature 96 contains spring loaded sealing members 99, 100 facing the pressure and exhaust ports respectively. When coil 94 is not energized spring-loaded plungers 98 bearing on closure 101 urge the armature downwards to close port 92, service port 93 being connected to exhaust port 97 by a channel 102 in the armature. Energization of coil 94 lifts the armature to close port 97 and connect ports 92 and 93, admitting compressed air to the associated cylinder.

It has been found advisable to prevent any tendency of finger 15 to move diagonally since such movement might interfere with the mechanical movements of the gearbox mechanisms. To this end, switch 43 is used as a sequence switch, being connected as shown in FIG. 13 so that it only permits power to be applied for the transverse movements of the finger when the rod 17 is at either extreme position or its central position.

It is to be understood that the above description is given by way of example only and the invention is not restricted thereto. In particular the invention can be applied to gear-boxes having any arbitrarily chosen selection pattern. Also alternative shift patterns can be provided at the gate to correspond to the layout of the particular gearbox with which the control device is to be used (e.g. for continental European, British, or other standard gear shifts). By slightly changing the electrical circuit wiring the directions of the longitudinal and transverse movements of the selector finger corresponding to given movements of the control lever can be reversed.

I claim:

1. A gear control mechanism for cooperation with a shift bar or other operating member of a gearbox of an automotive vehicle, including a slave unit for attachment to the gearbox, and an operator's remote control unit, the slave unit having a selector member adapted to engage the operating member when the slave unit is attached to the gearbox, a first pair of opposed air cylinders for moving the selector member in two opposite directions, a second pair of opposed air cylinders for moving the selector member in two opposite directions perpendicular to the two first mentioned directions, a plurality of solenoid valves controlling the supply of air to the cylinders, and the control unit having a plurality of switches electrically connected to the solenoid valves whereby operation of the switches actuates the air cylinders.

2. The gear control mechanism as claimed in claim 1 in which the slave unit includes a housing, a rod which can rotate about and slide parallel to its axis in the housing, a first pair of air cylinders enclosing opposite ends of the rod, a piston in each cylinder connected to the rod for moving the rod axially, a finger axially fast with and projecting laterally from the rod and constituting the selector member, a second pair of air cylinders on opposite sides of the finger and at right angles to the first pair of cylinders, and pistons in the second pair of cylinders engaging opposite sides of the finger for pivoting the finger about the axis of the rod.

3. The gear control mechanism as claimed in claim 1, having for each pair of cylinders a first solenoid valve connected to a first cylinder of the pair, a second solenoid valve connected to the second cylinder of the pair, and a third solenoid valve connected to both cylinders of the pair, each solenoid valve being adapted to admit compressed air to or exhaust the air from the associated cylinder or cylinders, admission of compressed air by either one of the first and second valves serving to move the selector member in a respective one of said directions and admission of compressed air by the third valve serving to center the selector member with respect to the two cylinders of the pair, not more than one of the said first second and third valves admitting compressed air at any one time.

4. The gear control mechanism as claimed in claim 3 in which each solenoid valve when de-energized exhausts the associated cylinder or cylinders and in which the first solenoid valve is controlled by a first normally open switch, the second solenoid valve is controlled by a second normally open switch, and the third solenoid valve is controlled by two normally closed switches connected in series and each associated with a respective one of the first and second switches so as to be closed when the associated first or second switch is opened.

5. The gear control as claimed in claim 1 in which the slave unit includes a housing, a rod which can rotate about and slide parallel to its axis in the housing, a first pair of air cylinders enclosing opposite ends of the rod, a piston in each cylinder connected to the rod for moving the rod axially, a finger axially fast with and projecting laterally from the rod and constituting the selector member, a second pair of air cylinders on opposite sides of the finger and at right angles to the first pair of cylinders, and pistons in the second pair of cylinders engaging opposite sides of the finger for pivoting the finger about the axis of the rod, the rod having a predetermined axial operating stroke and having at each end an inner and an outer abutment between which the piston of the associated cylinder of the first pair of cylinders can slide on the rod, engagement of both pistons with their respective inner abutments centering the rod axially in the housing and engagement of either one of the pistons of the first pair of cylinders with the respective outer abutments moving the rod in a corresponding axial direction, in which first and second solenoid valves communicate with the inner ends of respective cylinders of the first pair for connecting the cylinders to atmosphere or a supply of compressed air, and in which a third solenoid valve communicates with the outer ends of both of the first pair of cylinders for connecting the cylinders to atmosphere or a supply of compressed air, not more than one of said valves admitting compressed air at any one time.

6. The gear control as claimed in claim 1 in which the slave unit includes a housing, a rod which can rotate about and slide parallel to its axis in the housing, a first pair of air cylinders enclosing opposite ends of the rod, a piston in each cylinder connected to the rod for moving the rod axially, a finger axially fast with and projecting laterally from the rod and constituting the selector member, a second pair of air cylinders on opposite sides of the finger and at right angles to the first pair of cylinders, and pistons in the second pair of cylinders engaging opposite sides of the finger for pivoting the finger about the axis of the rod, each of the second pair of cylinders containing an outer piston, an abutment limiting the inward movement of the outer piston, an inner piston acting on the finger, the length of the inner piston being substantially equal to the distance between the abutment and the finger when the latter is centered in the housing, engagement of both outer pistons with their respective abutments centering the finger and inward movement of either one of the inner pistons pivoting the finger, in which first and second solenoid valves communicate with respective spaces between the inner and outer pistons of respective ones of the second pair of cylinders for connecting the space to atmosphere or a supply of compressed air and in which a third solenoid valve communicates with the outer ends of both of said cylinders for connecting the cylinders to atmosphere or a source of compressed air, not more than one of the valves admitting compressed air at any one time.

7. The gear control as claimed in claim 1 in which the slave unit includes a housing, a rod which can rotate about and slide parallel to its axis in the housing, a first pair of air cylinders enclosing opposite ends of the rod, a piston in each cylinder connected to the rod for moving the rod axially, a finger axially fast with and projecting laterally from the rod and constituting the selector member, a second pair of air cylinders on opposite sides of the finger and at right angles to the first pair of cylinders, and pistons in the second pair of cylinders engaging opposite sides of the finger for pivoting the finger about the axis of the rod, a cam surface on the rod, a cam follower bearing on the cam surface, and electrical switching means adapted to be operated by the cam for controlling a clutch mechanism of the vehicle to disengage the clutch during changes of gear.

8. The gear control as in claim 7 in which the cam surface consists of three portions spaced axially and projecting laterally from the rod and depressed portions separating the projecting portions, the cam follower bearing on one of the projecting portions when the rod is in either of its extreme axially displaced positions or a central position.

9. A gear control mechanism for cooperation with a shift bar or other operating member of a gearbox of an automotive vehicle, including a slave unit for attachment to the gearbox and an operator's remote control unit, the slave unit having a selector member adapted to engage the operating member when the unit is attached to the gear box, a plurality of air cylinders for moving the operating member in mutually perpendicular directions, a plurality of solenoid valves controlling the supply of air to the cylinders, said control unit including a plurality of switches electrically connected to the solenoid valves whereby operation of the switches actuates the air cylinders, a gate, a pivoted control lever movable in the gate between a plurality of predetermined positions with the lever when in each predetermined position operating a switch or combination of switches unique to that position whereby said valves are actuated to bring the selector member to a position corresponding to that of the control lever, a master switch operably associated with the control lever and connected in series with all of the switches connected to the solenoid valves with said master switch being normally opened and being closed by movement of the control lever away from any of the predetermined positions, and a holding switch coupled in parallel with the master switch and operable by the selector member, with said holding switch being opened when the selector member is in a position corresponding to engagement of a gear or neutral.

10. The gear control as in claim 9 including a member resiliently mounting the control lever and which member can move with the lever to actuate the switches connected to the solenoid valves, and electrical contacts on the lever and member constituting the master switch, said contacts being normally open and being arranged to close on application of a force to move the lever away from any of said positions.

11. The gear control as in claim 10 including a frame pivotable about a first axis, and a sleeve coaxial with said lever and pivotable in said frame about a second axis perpendicular to said first axis, said sleeve constituting said member, and wherein some of said switches connected to said valves are fixedly mounted for operation by pivoting of said frame about said first axis and the rest of said switches are mounted on said frame for operation by pivoting of said sleeve about said second axis.

References Cited by the Examiner

UNITED STATES PATENTS

| 2,617,311 | 11/1952 | Miller | 192—.098 X |
| 2,627,168 | 2/1953 | Stevens | 192—87 X |
| 2,943,500 | 7/1960 | Wittren | 74—364 X |
| 3,103,826 | 9/1963 | Jaeschke | 74—364 X |

DAVID J. WILLIAMOWSKY, *Primary Examiner.*

A. T. McKEON, *Assistant Examiner.*